United States Patent
Kottler et al.

(10) Patent No.: US 9,645,873 B2
(45) Date of Patent: May 9, 2017

(54) INTEGRATED CONFIGURATION MANAGEMENT AND MONITORING FOR COMPUTER SYSTEMS

(71) Applicant: Red Hat, Inc., Raleigh, NC (US)

(72) Inventors: Samuel H. Kottler, Fairfield, CT (US); Seth K. Vidal, Durham, NC (US)

(73) Assignee: Red Hat, Inc., Raleigh, NC (US)

( * ) Notice: Subject to any disclaimer, the term of this patent is extended or adjusted under 35 U.S.C. 154(b) by 157 days.

(21) Appl. No.: 13/908,335

(22) Filed: Jun. 3, 2013

(65) Prior Publication Data

US 2014/0359365 A1 Dec. 4, 2014

(51) Int. Cl.
G06F 11/00 (2006.01)
G06F 11/07 (2006.01)
G06F 11/34 (2006.01)
G06F 11/30 (2006.01)

(52) U.S. Cl.
CPC ........ *G06F 11/079* (2013.01); *G06F 11/3058* (2013.01); *G06F 11/3409* (2013.01); *G06F 11/3419* (2013.01); *G06F 11/301* (2013.01); *G06F 11/3006* (2013.01); *G06F 2201/81* (2013.01)

(58) Field of Classification Search
CPC ............... G06F 11/079; G06F 11/0778; G06F 11/3648; G06F 11/3466
USPC .......................................................... 714/37
See application file for complete search history.

(56) References Cited

U.S. PATENT DOCUMENTS

| 6,957,364 | B2 | 10/2005 | Shimooka et al. |
| 8,356,088 | B2 | 1/2013 | Montagna et al. |
| 2005/0015667 | A1* | 1/2005 | Aaron ................. G06F 11/0709 714/25 |
| 2007/0124112 | A1* | 5/2007 | Weyermann .................. 702/182 |
| 2009/0254652 | A1 | 10/2009 | Binswanger et al. |
| 2009/0278680 | A1* | 11/2009 | Hollender .......... G05B 23/0216 340/514 |
| 2011/0225582 | A1 | 9/2011 | Iikura et al. |
| 2012/0030346 | A1* | 2/2012 | Fukuda et al. ................ 709/224 |
| 2012/0324456 | A1 | 12/2012 | Teather |

(Continued)

FOREIGN PATENT DOCUMENTS

JP 2007293393 11/2007

OTHER PUBLICATIONS

"eG Configuration Manager", http://www.eginnovations.com/web/configuration-change-management.htm.

(Continued)

*Primary Examiner* — Yair Leibovich
(74) *Attorney, Agent, or Firm* — Lowenstein Sandler LLP (57) ABSTRACT

Systems and methods for integrated configuration management and monitoring. An example method may comprise assigning a plurality of parameter values to a plurality of configuration parameters of a computer system; monitoring a plurality of state parameters of the computer system; detecting a current state transition of the computer system, the current state transition involving a variation of a value of a state parameter such that a new value of the state parameter falls outside of a defined range; and identifying a root cause candidate configuration parameter having a value modified within a time period between the current state transition and the previous state transition of the computer system.

20 Claims, 7 Drawing Sheets

(56) References Cited

U.S. PATENT DOCUMENTS

2013/0326051 A1* 12/2013 LeGendre et al. ............ 709/224
2015/0308945 A1* 10/2015 Hanyu ................... G01N 21/59
                                                                                                              250/372

OTHER PUBLICATIONS

"Using Desired Configuration Management to Monitor Client Compliance" (Jan. 1, 2011), http://technet.microsoft.com/en-us/library/ff823893.aspx.

* cited by examiner

FIG.1a

FIG.1b $V_{1\,min} <= P_1 <= V_{1\,max}$
...
$V_{k\,min} <= P_k <= V_{k\,max}$
...
$V_{n\,min} <= P_n <= V_{n\,max}$

INTEGRATED CONFIGURATION MANAGEMENT AND MONITORING FOR COMPUTER SYSTEMS

TECHNICAL FIELD

The present disclosure is generally related to computer systems, and is more specifically related to integrated configuration management and monitoring for computer systems.

BACKGROUND

A computer system, such as a physical server or a virtual machine running on a physical server, may run multiple applications. Each of those applications, as well as the underlying operating system and hardware, may have numerous configuration parameters designed to affect various aspects of the hardware, operating system, and/or application performance.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for integrated configuration management and monitoring for computer systems. A computer system herein shall refer to a system comprising one or more processors, one or more memory devices, and one or more input/output (I/O) interfaces. In one illustrative example, a computer system may be provided by a server running an operating system and multiple applications. Each of those applications, as well as the underlying operating systems, virtual machines, and hardware, may have numerous configuration parameters designed to control various operational aspects of the respective application, virtual machines, operating systems, and/or hardware. Examples of configuration parameters may include hardware configuration parameters, operating system configuration parameters, virtual machine configuration parameters, and/or application configuration parameters. A configuration management component may be employed to assign values to the configuration parameters of a computer system.

Functioning of the computer system may be described by numerous state parameters characterizing various operational aspects of the hardware, operating systems, virtual machines, and/or applications. Examples of state parameters may include hardware state parameters, operating system state parameters, virtual machine state parameters, and/or operating system state parameters.

A monitoring component may be employed to monitor state parameters of the computer system. One or more normal operational ranges may be assigned to each state parameter, such that the parameter value being within a normal operational range may indicate an acceptable mode of operation of the computer system or its subsystem, while the parameter value falling outside of the normal operational range may indicate possible undesired behavior of the computer system or its subsystem. For example, the amount of available physical memory being less than a threshold value may lead to a failure to allocate a memory buffer by an application, and thus cause an abnormal termination of the application.

A computer system state may be defined by the values of one or more computer system state parameters being within respective pre-defined or dynamically calculated ranges. "Pre-defined" herein refers to one or more values determined at any time before the moment when the value is used by, or is communicated to, a system or component using the value, including just-in-time value calculation.

A variation of at least on state parameter value, such that the new value of the state parameter falls outside of a pre-defined or dynamically calculated range for the state parameter, may cause a state transition by the computer system. In one illustrative example, the computer system may transition from a normal operational mode to an abnormal operational mode. In certain implementations, an abnormal operational mode of a computer system may be characterized by a hardware error, an operating system error, a virtual machine error, and/or an application error. The monitoring component may be designated to detect a state transition by the computer system, by detecting a variation of at least one state parameter value, such that the new value of the state parameter falls outside of a pre-defined or dynamically calculated range for the state parameter.

The state transition by the computer system may be caused, among other factors, by variations of one or more of configuration parameter values. For example, erroneously assigned IP address may lead to an application server's failure due to the latter's inability to communicate to a database server. Hence, responsive to the monitoring component's detecting a state transition by the computer system, a diagnostic component may identify one or more configuration parameters, referred to as "root cause candidate configuration parameters" herein below, variations of which might have caused the state transition by the computer system.

In one illustrative example, a parameter may be designated as a root cause candidate configuration parameter if its value was changed within a pre-defined or dynamically calculated period of time immediately preceding the detected computer system state transition. In another illustrative example, a configuration parameter may be designated as a root cause candidate parameter if its value was changed after the previous system state transition.

The diagnostic component may assign relevance indicators to one or more root cause candidate parameters. In one illustrative example, the diagnostic component may determine, based on a historical data analysis, a degree of correlation between a variation of a root cause configuration parameter value and the computer system state transition.

Thus, a computer system in accordance with one or more aspects of the present disclosure may integrate a configuration management component, a monitoring component, and a diagnostic component, as described in more details herein below. The above noted integrated components may be advantageously employed to determine root causes of state transitions by the computer systems, including, e.g., transitions into an error state. Various aspects of the above referenced methods and systems are described in details herein below by way of examples, rather than by way of limitation.

Figure 1A:
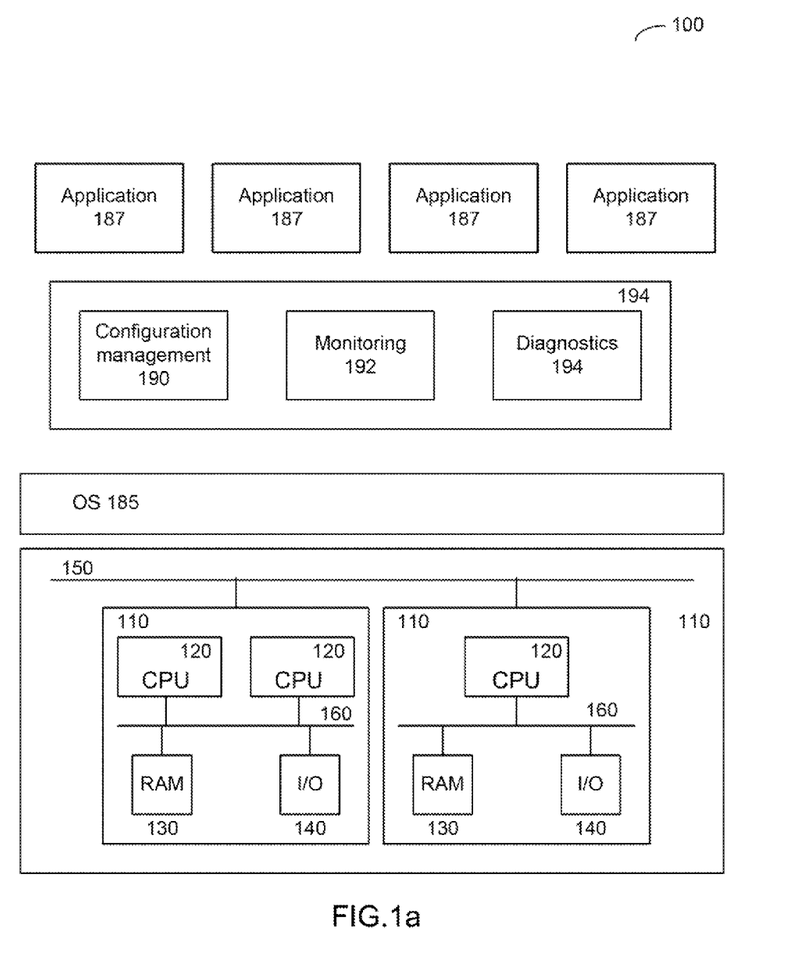
FIGS. 1a-1b depict component diagrams of example computer systems, in accordance with one or more aspects of the present disclosure.

FIG. 1a depicts a high-level component diagram of an example computer system 100 in accordance with one or more aspects of the present disclosure. The computer system 100 may include one or more interconnected nodes 110. "Node" herein shall refer to a group of one or more processors and one or more associated memory devices locally accessible by the processors in the group. Each node 110 may in turn include one or more physical processors 120 communicatively coupled to memory devices 130 and input/output (I/O) devices 140.

"Physical processor" or "processor" herein shall refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120 may be interconnected using a variety of techniques, ranging from a point-to-point processor interconnect, to a system area network 150, as shown in FIG. 1a. Local connections within each node 110, including the connections between a processor 120 and a memory 130 and between a processor 120 and an I/O device 140 may be provided by one or more local buses 160 of suitable architecture, for example, PCI. One or more applications 187 may be executed by the computer system 100 under an operating system 185.

Figure 1B:
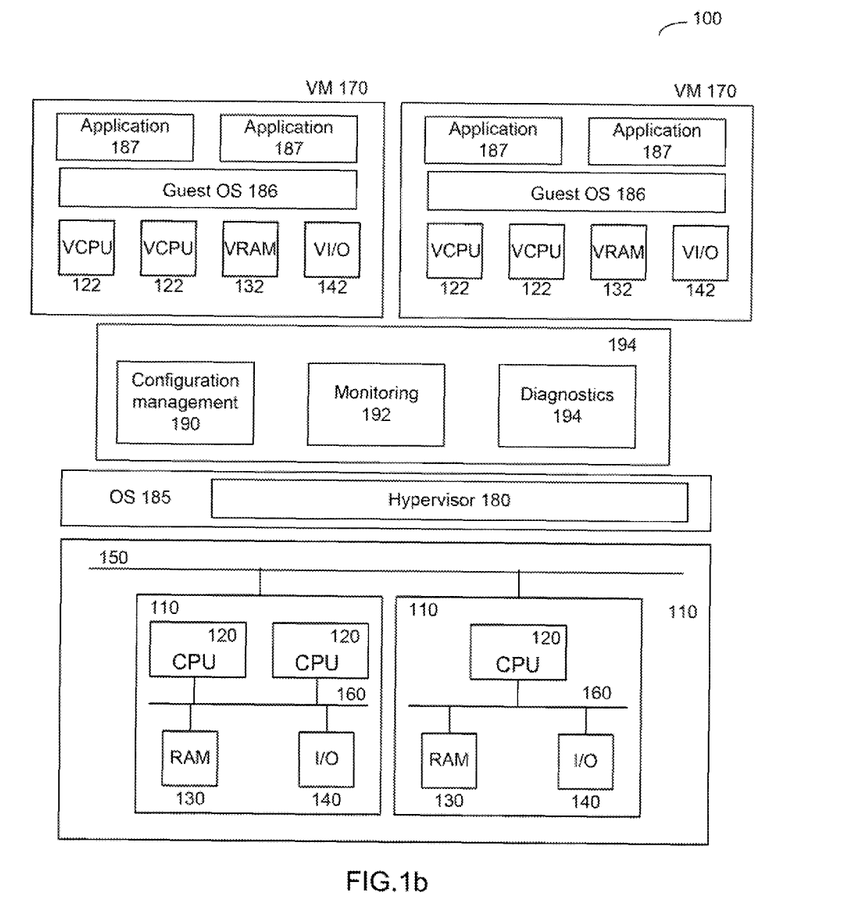

FIG. 1b depicts a high-level component diagram of another example computer system 100 providing a virtualization environment, in accordance with one or more aspects of the present disclosure. The computer system 100 may run multiple virtual machines 170, by executing a software layer 180, often referred to as "hypervisor," above the hardware and below the virtual machines, as schematically shown in FIG. 1b. In certain implementations, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices, including virtual processors 122, virtual memory 132, and virtual I/O devices 142. Processor virtualization may be implemented by the hypervisor 180 scheduling time slots on one or more physical processors 120. Memory virtualization may be implemented by a page table (PT) which is a memory structure translating virtual memory addresses to physical memory addresses.

A virtual machine 170 may execute a guest operating system 186 which may utilize the underlying virtual devices 122, 132, and 142, each of which may map to a device of the host machine (e.g., a network interface device, a CD-ROM drive, etc.). One or more applications 187 may be running on a virtual machine 170 under the guest operating system 186.

In certain implementations, the computer system 100 may further execute one or more components of an integrated configuration management and monitoring system. In one illustrative example, the computer system 100 may execute a configuration management component 190, a monitoring component 192, and a diagnostic component 194. In another illustrative example, one or more of the above noted components may be executed by an external computer system (not shown in FIGS. 1a-1b) which may be communicatively coupled to the computer system 100 over a network. In a further illustrative example, at least one of the above noted components may have a first sub-component executed by the computer system 100, in communication with a second sub-component executed by an external computer system (not shown in FIGS. 1a-1b) which may be communicatively coupled to the computer system 100 over a network. In certain implementations, the components designation may be purely functional, and two or more of the components 190-194 may be provided by a single software application 194 which may be executed by the computer system 100 and/or an external computer system (not shown in FIGS. 1a-1b) which may be communicatively coupled to the computer system 100 over a network.

The configuration management component 190 may be employed to assign and/or modify values of the configuration parameters of the computer system 100. In certain implementations, the configuration management component 190 may utilize a graphical user interface for assigning and/or modifying configuration parameter values. In one illustrative example, the graphical user interface may be running on the computer system 100. Alternatively, the graphical user interface may be executed by an external computer system (not shown in FIGS. 1a-1b) which may be communicatively coupled to the computer system 100 over a network.

Numerous configuration parameters may be designated to control various operational aspects of the hardware, operating systems, and/or applications executed by the computer system 100. Examples of configuration parameters may include hardware configuration parameters (such as, e.g., I/O interface parameters, memory configuration parameters, and/or processor configuration parameters), operating system configuration parameters (such as, e.g., users and user groups), virtual machine configuration parameters (such as, e.g., number of virtual processors), and/or application configuration parameters (such as a working directory, maximum number and size of memory buffers, etc.).

In certain implementations, a plurality of configuration parameters may be stored in one or more configuration files accessible by one or more applications and/or operating system components. In one illustrative example, the configuration files may be directly accessible for read and/or write operations via a user interface of the computer system 100 by a user having a requisite privilege level. Alternatively, the configuration files may only be accessible via a dedicated configuration management application, by a user and/or application having a requisite privilege level.

The functioning of the computer system 100 may be described by a plurality of state parameters. State parameters of the computer system 100 may be designated to characterize various operational aspects of the hardware, operating systems, virtual machines and/or applications executed by the computer system 100. Examples of state parameters may include hardware state parameters (such as, e.g., the processor usage, the amount of available physical memory, etc.), operating system state parameters (such as, e.g., the number of active processes), virtual machine state parameters (such as, e.g., the number of active virtual processors), and/or application state parameters (such as the number of active sessions, etc.).

Figure 2:
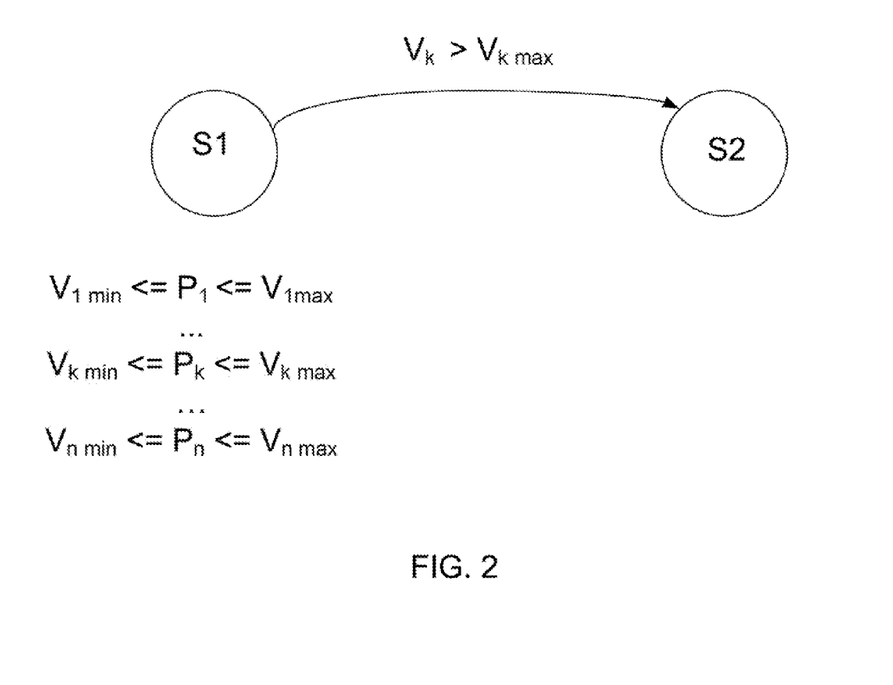
FIG. 2 schematically illustrates several states of the computer system 100 of FIG. 1, in accordance with one or more aspects of the present disclosure.

In certain implementations, the state of the computer system 100 may be defined by values of one or more state parameters. In one illustrative example, for each state a plurality of parameter value ranges may be defined, such that the computer system 100 may exist in a defined state when one or more state parameters have values within respective pre-defined or dynamically calculated ranges. A variation of at least on state parameter value, such that the new value of the state parameter falls outside of a pre-defined or dynamically calculated range for the state parameter, may cause the computer system 100 to transition from one state into another state, as schematically illustrated by FIG. 2. In the example of FIG. 2, the computer system may exist in the state $S_1$ until the values of the state parameters $P_1, \ldots, P_n$ are within the respective ranges $[V_{1\ min}, V_{1\ max}], \ldots, [V_{n\ min}, V_{n\ max}]$. Variation of the value of the state parameter $P_k$, such that the new value of $P_k$ exceeds the threshold value $P_{k\ max}$, causes the computer system 100 to transition to the state $S_2$.

In certain implementations, the monitoring component 192 may be employed to monitor the values of one or more state parameters of the computer system 100. In one illustrative example, one or more states of the computer system 100 characterized by respective state parameter value ranges may correspond to a normal mode of operation of the computer system 100 or one or more subsystems of the computer system 100, and one or more states of the computer system 100 characterized by at least one parameter value falling outside a permissible value range may correspond to an abnormal mode of operation of the computer system 100 or one or more subsystems of the computer system 100. For example, the amount of available physical memory falling below a threshold value may lead to an application failure to allocate a memory buffer and thus cause the application to terminate. In certain implementations, an abnormal operational mode of a computer system may be characterized by a hardware error, an operating system error, a virtual machine error, and/or an application error.

The monitoring component 192 may be designated to detect a state transition by the computer system, by detecting a variation of at least one state parameter value. In one illustrative example, a state transition may be detected if the new value of the state parameter falls outside of a pre-defined or dynamically calculated range. Alternatively, a state transition may be detected if the new value of the state parameter falls within of a pre-defined or dynamically calculated range.

In a further aspect, a state transition by the computer system 100 may be caused, among other factors, by variations of one or more of configuration parameter values. For example, an invalid IP address value assigned to a network interface of an application server may lead to the application server's failure due to its inability to communicate to a database server. Thus, responsive to the monitoring component's 192 detecting a system state transition, the diagnostic component 194 may identify one or more a root cause candidate configuration parameters variations of which may have caused the state transition.

Figure 3A:
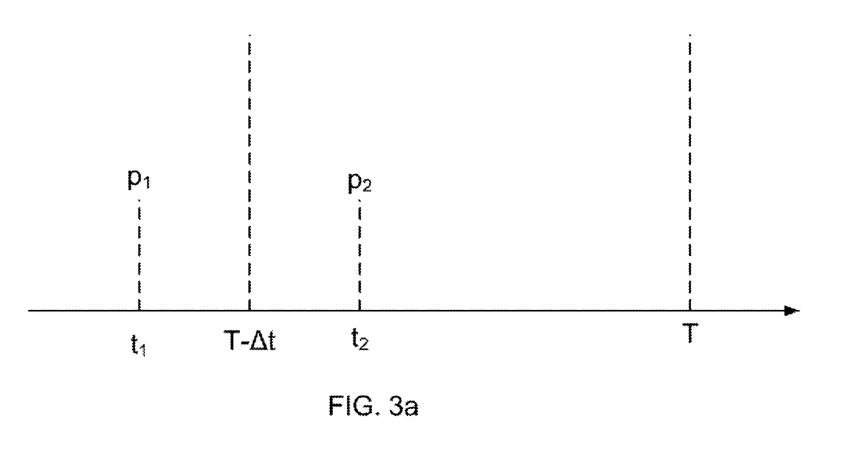
FIGS. 3a-3b schematically illustrate designating configuration parameters as root candidate parameters respective to a system state transition, in accordance with one or more aspects of the present disclosure.

In one illustrative example, a configuration parameter may be designated as a root cause candidate parameter if its value was changed within a pre-defined or dynamically calculated period immediately preceding the detected state transition by the computer system 100, as schematically illustrated by FIG. 3a. In the example of FIG. 3a, the system state change was diagnosed as having occurred at the time T. The value of the configuration parameter $p_1$ was changed at the time $t_1$, and the value of the configuration parameter $p_2$ was changed at the time $t_2$. The latter time falls within a pre-defined or dynamically calculated time period T−Δt immediately preceding the state transition time T. Hence, the configuration parameter pr may be designated as a root cause candidate with respect to the system state transition which have occurred at the time T.

Figure 3B:
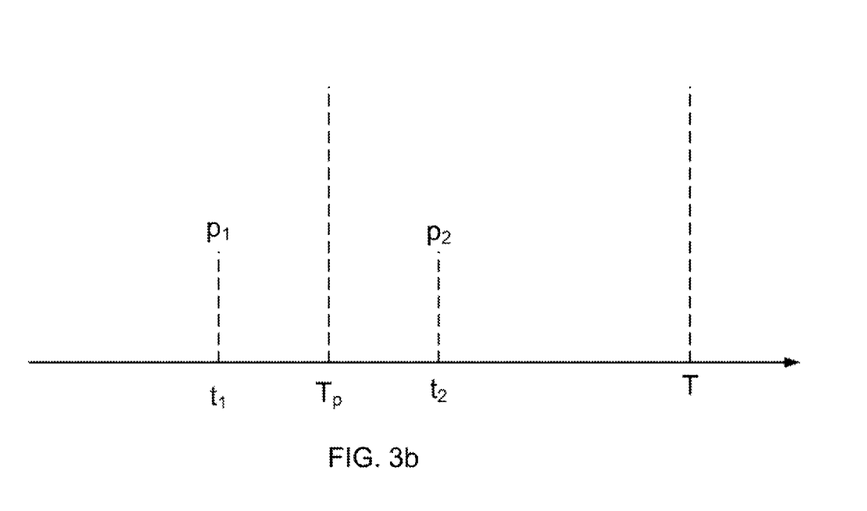

In another illustrative example, a configuration parameter may be designated as a root cause candidate parameter if its value was changed after the previous system state transition, as schematically illustrated by FIG. 3b. In the example of FIG. 3b, the system state change was diagnosed as having occurred at the time T. The previous system state change occurred at the time $T_p$. The value of the configuration parameter $p_1$ was changed at the time $t_1$, and the value of the configuration parameter $p_2$ was changed at the time $t_2$. The latter time was after the time of the previous state change $T_p$. Hence, the configuration parameter $p_2$ may be designated as a root cause candidate with respect to the system state transition which have occurred at the time T.

Thus, in one illustrative example, the diagnostic component 194, responsive to detecting a system state transition, may analyze one or more system logs to determine which configuration parameters have their values changed within a pre-defined or dynamically calculated period immediately preceding the state transition. Alternatively, the diagnostic component 194, responsive to detecting a system state transition, may analyze one or more system logs to determine which configuration parameters have their values changed after the previous state transition.

In certain implementations, the diagnostic component 194 may analyze historical data reflecting configuration parameter values and/or state parameter values over one or more periods of time, to determine whether a statistical relationship exists between variation of values of one or more root cause candidate parameters and the detected system state change. In one illustrative example, the diagnostic component 194 may determine a degree of correlation, represented, e.g., by a correlation coefficient or a correlation ratio between variation of values of one or more root cause candidate parameters and the detected system state change.

In certain implementations, the diagnostic component 194 may assign relevance indicators to one or more root cause candidate parameters. In one illustrative example, the relevance indicator may be derived from a correlation coefficient or a correlation ratio between variation of values of one or more root cause candidate parameters and the detected system state change.

Figure 4:
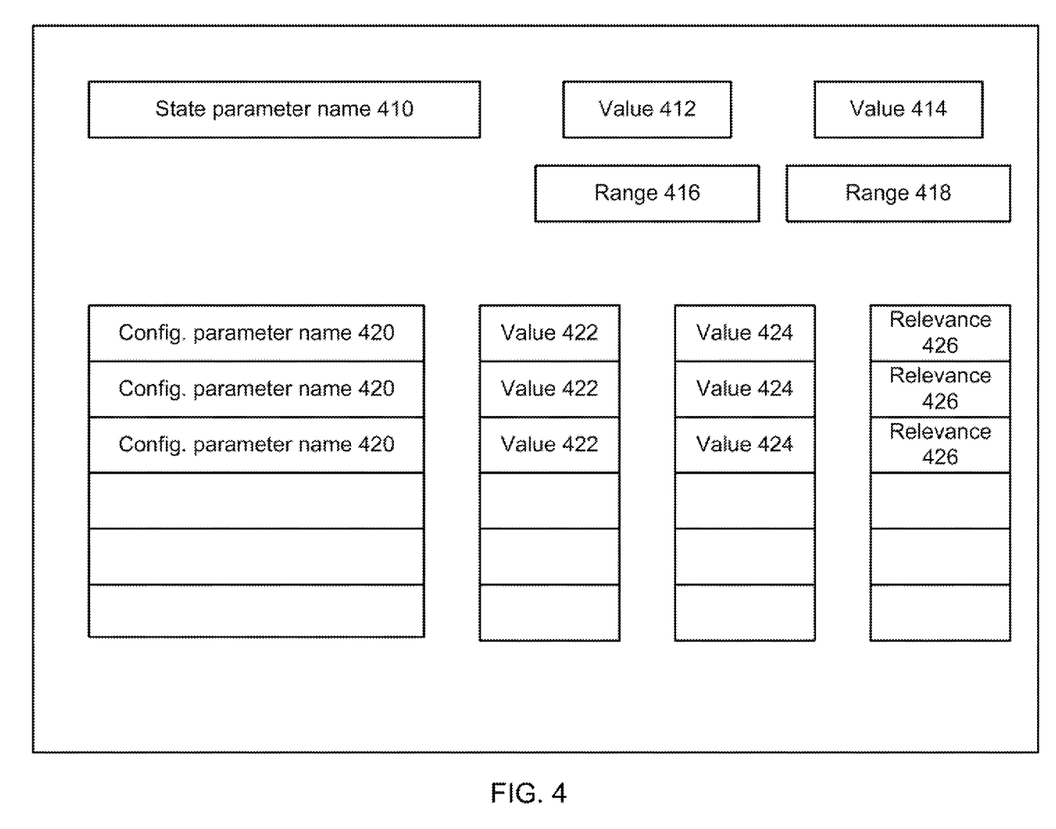
FIG. 4 schematically illustrates an example user interface for presenting configuration and system state parameters values, in accordance with one or more aspects of the present disclosure.

In certain implementations, the diagnostic component 194 may present the root cause candidate parameters and their respective relevance indicators via a user interface. In one example, as schematically illustrated by FIG. 4, the presentation may include displaying a system state parameter name 410 the variation of which caused the system state transition; the parameter values before and after the state transition, 412 and 414 respectively; the parameter value ranges corresponding to the old and new system states, 416 and 418 respectively; and one or more root cause candidate parameters 420, together with the parameter values before and after the state transition, 422 and 424 respectively; and a relevance indicator values 426 for each root cause candidate parameter.

In a further aspect, the computer system state transition may involve an application state transition, caused by variation of at least one application state parameter value, such that the new value of the application state parameter falls outside of a pre-defined or dynamically calculated range for the application state parameter. Responsive to detecting an application state transition, the diagnostics component 194 may be designed to select one or more candidate configuration parameters among the configuration parameters of the application, by analyzing the system log of configuration parameter modifications occurred between the previous system state change and the current system state change. In one illustrative example, responsive to detecting that a request processing time by an application server exceeds a pre-defined or dynamically calculated threshold value, the diagnostics component may determine that the maximum size of a database connection pool by the application server has been modified between the previous system state change and the current system state change, which might have caused queuing database requests by the application server, and hence the increase in the client request processing time by the application server.

In another illustrative example, the computer system state transition may involve a state transition by a first application running on the computer system 100, caused by variation of at least one state parameter value of the first application, such that the new value of the application state parameter falls outside of a pre-defined or dynamically calculated range for the application state parameter. Responsive to detecting an application state transition, the diagnostics component 194 may be designed to select one or more candidate configuration parameters among the configuration parameters of a second application, which is in communication with the first application. For example responsive to detecting that a request processing time by an application server exceeds a pre-defined or dynamically calculated threshold value, the diagnostics component may determine that the number of virtual processors on a virtual machine running the database server has been modified between the previous system state change and the current system state change, which might have caused queuing database requests by the application server, and hence the increase in the client request processing time by the application server.

Figure 5:
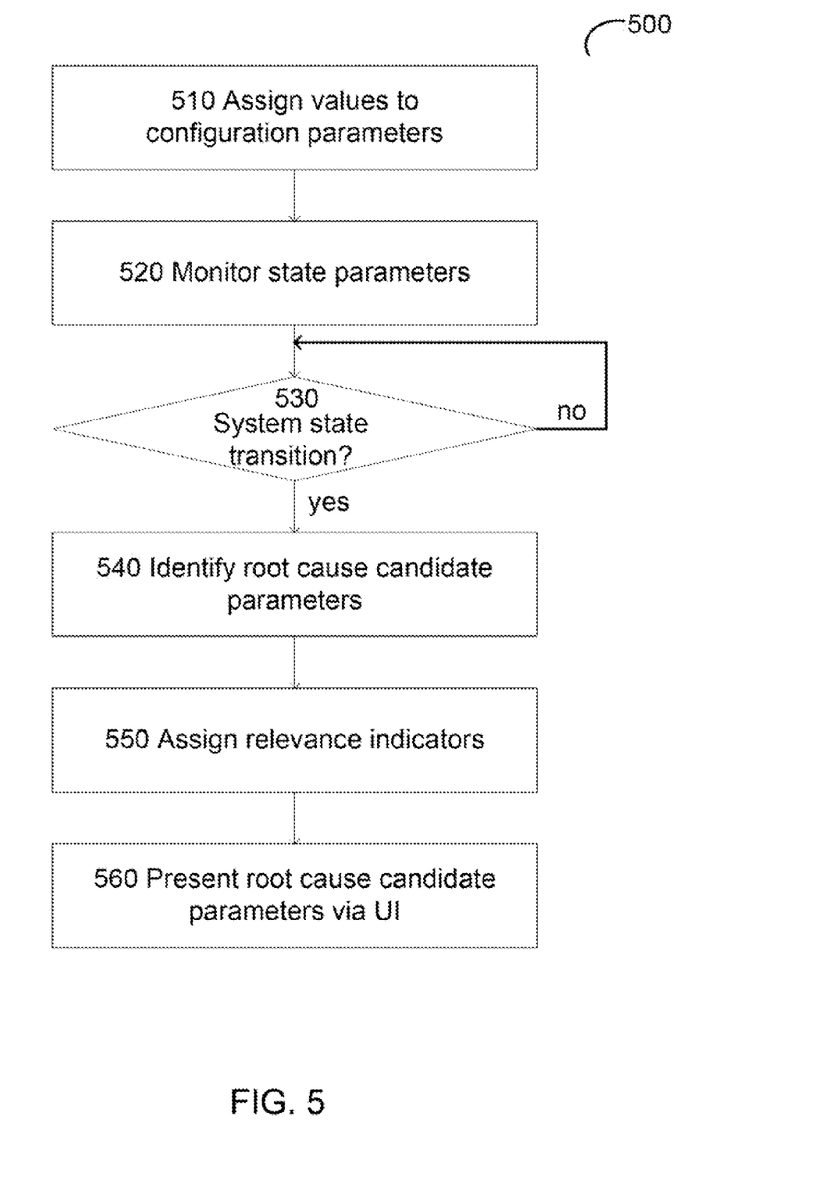
FIG. 5 depicts a flow diagram of an example method for integrated configuration management and monitoring, in accordance with one or more aspects of the present disclosure.

FIG. 5 depicts a flow diagram of an example method 500 for integrated configuration management and monitoring. The method 500 may be performed by a computer system that may comprise hardware (e.g., circuitry, dedicated logic, and/or programmable logic), software (e.g., instructions executable on a computer system to perform hardware simulation), or a combination thereof. The method 500 and/or each of its individual functions, routines, subroutines, or operations may be performed by one or more physical processors of the computer system executing the method.

At block 510, the computer system 100 of FIG. 1 may employ a configuration management component to assign parameter values to one or more configuration parameters. In one illustrative example, the configuration management component may utilize a graphical user interface for assigning and/or modifying configuration parameter values.

At block 520, the computer system may employ a monitoring component to monitor a plurality of state parameter values. The monitoring component may be designated to detect a state transition by the computer system, by detecting a variation of at least one state parameter value, such that the new value of the state parameter falls outside of a pre-defined or dynamically calculated range for the state parameter, as described in more details herein above.

Responsive to detecting, at block 530, a system state transition involving a variation of a value of a state parameter such that a new value of the state parameter falls outside of a pre-defined or dynamically calculated range, the processing may continue at step 540; otherwise the method may loop back to step 520.

At step 540, the computer system may employ a diagnostic component to identify one or more root cause candidate configuration parameters. In one illustrative example, a parameter may be designated as a root cause candidate configuration parameter if its value was changed within a pre-defined or dynamically calculated period of time immediately preceding the detected computer system state transition. In another illustrative example, a configuration parameter may be designated as a root cause candidate parameter if its value was changed after the previous system state transition.

At step 550, the computer system may assign relevance indicators to the identified one or more root cause candidate configuration parameters. In one illustrative example, the diagnostic component may determine, based on a historical data analysis, a degree of correlation between a variation of a root cause configuration parameter value and the computer system state transition, as described in more details herein above.

At step 560, the computer system may present via a user interface the identified one or more root cause candidate configuration parameters and their respective relevance indicators. Upon completing the operations schematically described by block 560, the method may terminate.

Figure 6:
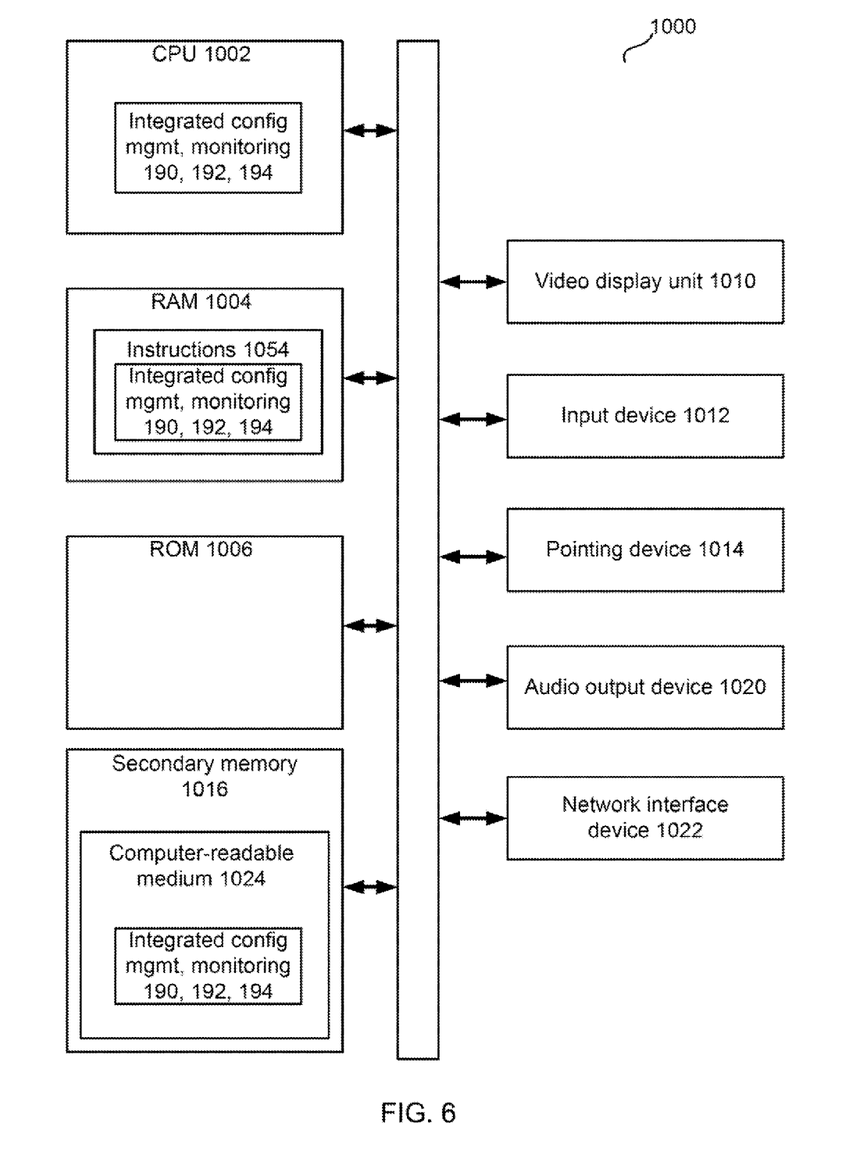
FIG. 6 depicts an illustrative computer system operating in accordance with examples of the invention.

FIG. 6 depicts an illustrative computer system operating in accordance with examples of the invention. In one example, computer system 1000 may correspond to the computer system 100 of FIGS. 1a-1b.

In one example, the computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a tangible computer-readable storage medium 1024 on which may be stored instructions 1054 encoding the configuration management component 190, a monitoring component 192, and a diagnostic component 194. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method, comprising:
assigning, by a hardware processor, a plurality of parameter values to a plurality of configuration parameters of a computer system;
monitoring a plurality of state parameters of the computer system;
detecting, by the hardware processor, a current state transition of the computer system during an active period of the computer system, wherein detecting the current state transition comprises determining that a value of a state parameter falls outside of a defined range; and
identifying, by the hardware processor in view of relevance indicators, a root cause candidate configuration parameter having a value modified within a time period preceding the current state transition and after a previous state transition detected during the active period of the computer system, wherein the identifying the root cause candidate configuration parameter comprises determining a correlation ratio between the root cause candidate configuration parameter and the current state transition in view of historical data analysis and assigning the relevance indicators to the root cause candidate configuration parameter in view of the correlation ratio.

2. The method of claim 1, wherein identifying the root cause candidate configuration parameter comprises identifying a configuration parameter having a value modified within a defined period immediately preceding the current state transition.

3. The method of claim 1, wherein identifying the root cause candidate configuration parameter comprises analyzing historical data reflecting at least one of a plurality of configuration parameter values or a plurality of state parameter values.

4. The method of claim 1, wherein the correlation ratio is a degree of correlation between a value of the root cause candidate configuration parameter and the current state transition.

5. The method of claim 1, further comprising presenting the root cause candidate configuration parameter via a user interface.

6. The method of claim 1, wherein the relevance indicators reflect a relevance of modifying the root cause candidate configuration parameter to the computer system state transition.

7. The method of claim 6, further comprising presenting the relevance indicators via user interface.

8. The method of claim 1, wherein the current state transition occurs from a normal system state to an abnormal system state.

9. The method of claim 8, wherein the abnormal system state comprises one of: a hardware error state, an operating system error state, a virtual machine error state, or an application error state.

10. The method of claim 1, wherein the plurality of configuration parameters comprises at least one of: a hardware configuration parameter, an operating system configuration parameter, a virtual machine configuration parameter, or an application configuration parameter.

11. The method of claim 1, wherein the plurality of state parameters comprises at least one of: a hardware state parameter, an operating system state parameter, a virtual machine state parameter, or an application state parameter.

12. The method of claim 1, wherein the assigning of the plurality of parameter values to the plurality of configuration parameters comprises inputting the plurality of parameter values via an input/output interface.

13. The method of claim 1, wherein the current computer system state transition comprises a state transition of an application running on the computer system; and
wherein the root cause candidate configuration parameter is represented by a configuration parameter of the application.

14. The method of claim 1, wherein the current computer system state transition comprises a state transition of a first application running on the computer system; and
wherein the root cause candidate configuration parameter is represented by a configuration parameter of a second application running on the computer system, the second application being in communication with the first application.

15. A system, comprising:
a memory; and
a hardware processor, operatively coupled to the memory, to:
assign a plurality of parameter values to a plurality of configuration parameters of a computer system;
monitor a plurality of state parameters of the computer system;
detect a current state transition of the computer system during an active period of the computer system, wherein detecting the current state transition comprises determining that a value of a state parameter falls outside of a defined range; and
identify, in view of relevance indicators, a root cause candidate configuration parameter having a value modified within a time period preceding the current state transition and after a previous state transition detected during the active period of the computer system, wherein identifying the root cause candidate configuration parameter comprises:
determining a correlation ratio between the root cause candidate configuration parameter and the current state transition in view of historical data analysis; and
assigning the relevance indicators to the root cause candidate configuration parameter in view of the correlation ratio.

16. The system of claim 15, wherein to identify the root cause candidate configuration parameter, the hardware processor is further to identify a configuration parameter having a value modified within a defined period immediately preceding the current state transition.

17. The system of claim 15, wherein the correlation ratio is a degree of correlation between a value of the root cause candidate configuration parameter and the current state transition.

18. A non-transitory computer-readable storage medium comprising executable instructions to cause a hardware processor to:
assign, by the hardware processor, a plurality of parameter values to a plurality of configuration parameters of a computer system;
monitor a plurality of state parameters of the computer system;
detect, by the hardware processor, a current state transition of the computer system during an active period of the computer system, wherein detecting the current state transition comprises determining that a value of a state parameter falls outside of a defined range; and
identify, by the hardware processor in view of relevance indicators, a root cause candidate configuration parameter having a value modified within a time period preceding the current state transition and after a previous state transition detected during the active period of the computer system, wherein identifying the root cause candidate configuration parameter comprises:
determining a correlation ratio between the root cause candidate configuration parameter and the current state transition in view of historical data analysis; and
assigning the relevance indicators to the root cause candidate configuration parameter in view of the correlation ratio.

19. The non-transitory computer-readable storage medium of claim 18, wherein executable instructions to identify the root cause candidate configuration parameter comprise executable instructions causing the hardware processor to identify a configuration parameter having a value modified within a defined period immediately preceding the current state transition.

20. The non-transitory computer-readable storage medium of claim 18, wherein the correlation ratio is a degree of correlation between a value of the root cause candidate configuration parameter and the current state transition.

* * * * *